United States Patent
Berkeley

(10) Patent No.: US 7,077,215 B2
(45) Date of Patent: Jul. 18, 2006

(54) TRAP RAKE STEERING TRAVEL LIMITER

(75) Inventor: James Berkeley, Pineville, NC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/839,762

(22) Filed: May 5, 2004

(65) Prior Publication Data

US 2005/0252667 A1    Nov. 17, 2005

(51) Int. Cl.
*A01B 31/00*    (2006.01)

(52) U.S. Cl. .................. 172/684.5; 172/199; 280/62

(58) Field of Classification Search ............ 172/684.5, 172/192, 197, 198, 199, 620, 200; 280/93.509, 280/62
See application file for complete search history.

(56) References Cited

U.S. PATENT DOCUMENTS

| | | | | |
|---|---|---|---|---|
| 3,613,802 A | * | 10/1971 | Carlson et al. ............. | 172/457 |
| 3,823,781 A | * | 7/1974 | Check et al. ............... | 172/192 |
| 4,566,712 A | * | 1/1986 | Motrenec .................... | 280/272 |
| 5,022,480 A | * | 6/1991 | Inagaki et al. ............. | 180/400 |
| 5,088,855 A | * | 2/1992 | Giliberti .................... | 404/103 |
| 5,154,241 A | * | 10/1992 | Comer et al. ............... | 172/816 |
| 5,492,033 A | * | 2/1996 | Hopey ....................... | 74/551.1 |
| 5,695,021 A | * | 12/1997 | Schaffner et al. ........... | 180/208 |
| 5,725,068 A | * | 3/1998 | Smith et al. ................ | 180/307 |
| 5,865,258 A | * | 2/1999 | McGrew, II ................ | 172/22 |
| 5,887,671 A | * | 3/1999 | Yuki et al. ................. | 180/68.1 |
| 5,890,545 A | * | 4/1999 | Smith et al. ................ | 172/200 |
| 6,820,714 B1 | * | 11/2004 | Schymczyk et al. ........ | 180/442 |

FOREIGN PATENT DOCUMENTS

| | | |
|---|---|---|
| JP | 09242629 | 9/1997 |
| JP | 2000-322589 | 10/2000 |

* cited by examiner

*Primary Examiner*—Victor Batson
(74) *Attorney, Agent, or Firm*—Harness, DIckey & Pierce P.L.C.

(57) ABSTRACT

A sand trap rake having a frame, a pair of rear wheels supporting the frame, a single front wheel supporting the frame, and a steering system operably interconnecting the steering wheel to the single front wheel. A grading device is coupled to the frame and is raised and lowered in response to a grading device actuation system. A steering limiting system is further coupled with the steering system. The steering limiting system is operable in a normal reaction mode and a slow reaction mode. A switch device is connected with the grading device actuation system such that the switch device outputs a control signal when the grading device is in the raised position. In response to the control signal, the steering limiting system consequently causes the steering system to operate in a slow reaction mode.

12 Claims, 1 Drawing Sheet

TRAP RAKE STEERING TRAVEL LIMITER

FIELD OF THE INVENTION

The present invention relates to three-wheeled vehicles and, more particularly, relates to a steering limiter system for three-wheeled vehicles, such as sand trap rakes.

BACKGROUND OF THE INVENTION

As is well known, three-wheeled vehicles are often used for various purposes ranging from golf course maintenance to recreation. These three-wheeled vehicles may be configured with either a single steerable rear wheel or a single steerable front wheel. In the case of three-wheeled vehicles used for golf course maintenance, namely the grooming and management of sand traps, these vehicles typically include a single steerable front wheel. Such vehicles typically must make relatively short turns in order to properly perform the required golf course grooming operations. Thus, any increase in the stability of the vehicle increases the safety of the vehicle.

Accordingly, there exists a need in the relevant art to provide a three-wheeled vehicle having a single steerable front wheel capable of providing improved handling and stability. Furthermore, there exists a need in the relevant art to provide a three-wheeled vehicle with a single steerable front wheel that is capable of limiting the turning rate of the front wheel relative to vehicle speed to maintain directional stability. Still further, there exists a need in the relevant art to provide a three-wheeled vehicle with a single steerable front wheel that overcomes the disadvantages of the prior art.

SUMMARY OF THE INVENTION

According to the principles of the present invention, a sand trap rake is provided having an advantageous construction. The sand trap rake includes a frame, a pair of rear wheels supporting the frame, a single front wheel supporting the frame, and a steering system operably interconnecting the steering wheel to the single front wheel. A grading device is coupled to the frame and is raised and lowered in response to a grading device actuation system. A steering limiting system is further coupled with the steering system. The steering limiting system is operable in a normal reaction mode and a slow reaction mode. A switch device is connected with the grading device actuation system such that the switch device outputs a control signal when the grading device is in the raised position. In response to this control signal, the steering limiting system consequently causes the steering system to operate in a slow reaction mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
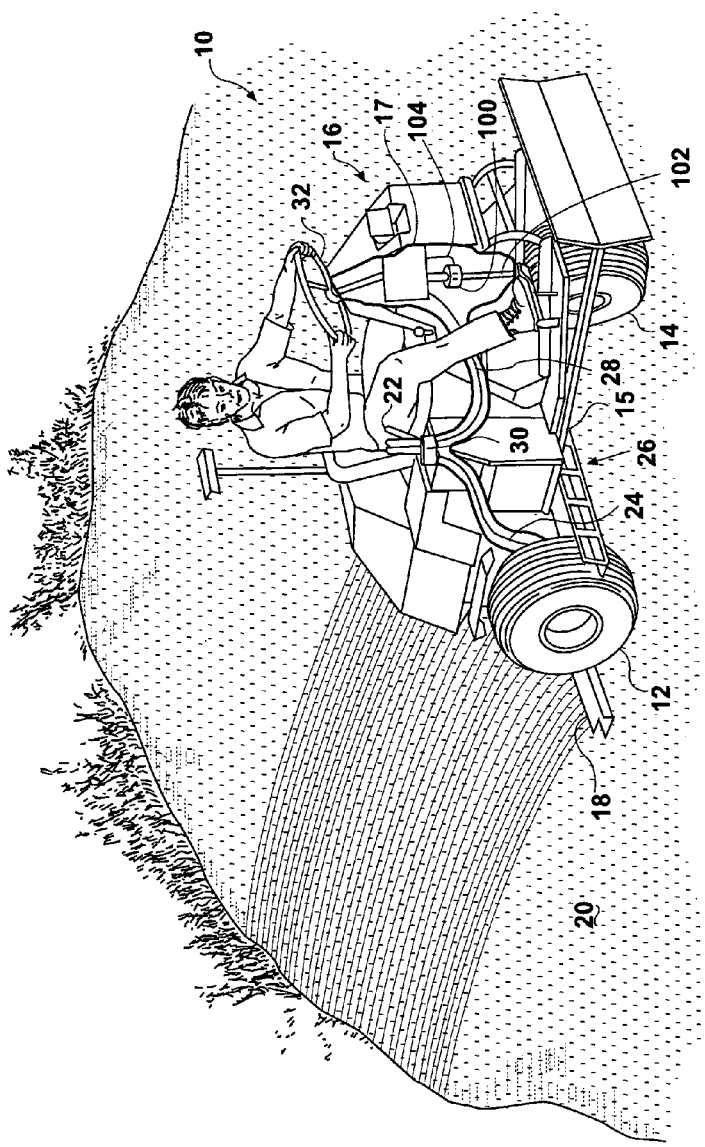
FIG. 1 is a perspective view illustrating a three-wheeled sand trap rake according to the principles of the present invention.

The following description of the preferred embodiments is merely exemplary in nature and is in no way intended to limit the invention, its application, or uses.

According to the principles of the present embodiments, multiple systems are provided to prevent an operator of a three-wheeled vehicle having a single steerable front wheel from causing the vehicle to roll, flip, or otherwise tip in response to abrupt steering input. In other words, the systems of the present invention serve to limit or otherwise inhibit such abrupt steering inputs to maintain directional stability.

According to a first preferred embodiment of the present invention, a three-wheeled vehicle 10, such as a sand trap rake, is provided. Sand trap rake 10 includes a pair of rear wheels 12 and a single steerable front wheel 14 supporting a frame 15. Sand trap rake 10 further includes a steering system 16 having a variable rate power steering limiter and logic system 17. Sand trap rake 10 is in the form of a rideable tractor having a raiseable rake or plow 18 extending from the rear thereof. The position of rake or plow 18 is controlled via a hand actuator 22 and a control line 24. Hand actuator 22 and control line 24 are preferably part of a hydraulic or electric actuation system 26. Actuation system 26 is coupled to steering system 16 via a line 28.

During operation, hand actuator 22 is actuated to lower rake or plow 18 to a ground surface 20, such as a golf course sand trap, to smooth, loosen, grade, rake, or the like ground surface 20. As hand actuator 22 is actuated, a rate limiter switch 30 is activated to send a control signal to steering system 16 via line 28. Rate limiter switch 30 is preferably an automatic switch that is moveable in response to actuation of hand actuator 22. However, it should be understood that rate limiter switch 30 may be a manual switch that is actuated by the operator. Upon receipt of the control signal from rate limiter switch 30, a control signal is sent to variable rate power steering limiter 17. Variable rate power steering limiter 17 is positionable in a first mode that permits normal reaction steering of front wheel 14 and in a second mode that modifies the steering ratio of steering system 16 in response to the control signal to define a slow reaction steering.

In this first mode, which is typically associated with a grading or plowing operating, it is preferable that steering system 16 is at its maximum responsiveness, namely permitting the tightest and quickest steering maneuvers. In this regard, the operation of sand trap rake 10 is conventional. In this second mode, which is associated with high speed transport or otherwise when plow 18 is raised, the steering ratio of steering system 16 is changed to slow reaction steering, which effectively requires a high number of turns of a steering wheel 32 or a high steering effort (to slow down the steering rate) from one direction limit to a second direction limit. This prevents an abrupt steering input and, thus, maintains steering system 16 within a turning radius that ensures stability of trap rake 10.

According to a second embodiment of the present invention, sand trap rake 10 described above may further include a turning restrictor 100. Turning restrictor 100 is disposed about a turning shaft 102 extending from variable rate power steering limiter 17. Turning restrictor 100 is controlled via a line 104 extending from variable rate power steering limiter 17. Turning restrictor 100 serves to exert a clamping force on turning shaft 102. The force exerted upon turning shaft 102 is proportional to the speed of sand trap rake 10. Therefore, as speed increases, the clamping force about turning shaft 102 increases, thereby causing more force to be exerted by the operator in order to affect a tight turning radius. Turning restrictor 100 is preferably activated (to exert a clamping force in response to increased speed) when variable rate power steering limiter 17 in the second mode (transport mode). It should be understood that turning restrictor 100 may be any type of engaging device capable of exerting an opposing turning force. By way of non-limiting example, turning restrictor 100 may be a friction strap disposed about shaft 102, a hydraulic manifold resisting a hydraulic turning signal, and the like.

Figure 2:
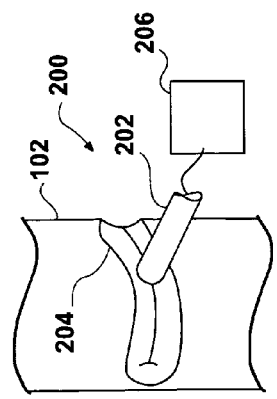
FIG. 2 is an enlarged perspective view illustrating a physical turning limiter.

According to a third embodiment of the present invention, as seen in FIG. 2, sand trap rake 10 includes a physical turning limiter 200. Physical turning limiter 200 includes a pin 202 selectively engagable with a slot 204 formed in turning shaft 102. Pin 202 is extendable in response to an actuator 206. Slot 204 is formed to permit only a predetermined minimum turning radius or turning travel of sand trap rake 10. Actuator 206 is preferably actuated to extend and engage pin 202 with slot 204 when rate limiter switch 30 detects plow 18 is raised. In this arrangement, abrupt turning are prevented, which in turn prevents steering system 16 from achieving a critical turning radius that would cause sand trap rake 10 to tip over.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A three-wheeled vehicle comprising:
   a frame;
   a pair of rear wheels supporting said frame;
   a single front wheel supporting said frame;
   a steering system coupling a steering wheel to said single front wheel, said steering system operable to pivot said single front wheel in response to a steering input from said steering wheel;
   a grading device positionable in a raised position and a lowered position; and
   a steering limiting system operably coupled with said steering system, said steering limiting system operable in a normal reaction mode when said grading device is in said lowered position, said normal reaction mode defined as one of a first steering ratio having one of a first number of turns of said steering wheel from a first to a second direction limit and a substantially unrestricted steering rate of turn, and a slow reaction mode when said grading device is in said raised position, said slow reaction mode defined as one of a second steering ratio greater than the first steering ratio and a restricted steering rate having an increased steering effort with respect to the unrestricted steering rate.

2. The three-wheeled vehicle according to claim 1, said steering limiting system having a switch device coupled with said grading device, said switch device outputting a control signal when said grading device is in said raised position causing said steering limiting system to switch to said slow reaction mode.

3. A three-wheeled vehicle comprising:
   a frame;
   a pair of rear wheels supporting said frame;
   a single front wheel supporting said frame;
   a steering system coupling a steering wheel to said single front wheel, said steering system operable to pivot said single front wheel in response to a steering input from said steering wheel;
   a grading device positionable in a raised position and a lowered position;
   a steering limiting system operably coupled with said steering system, said steering limiting system operable in a normal reaction mode when said grading device is in said lowered position and a slow reaction mode when said grading device is in said raised position; and
   a turning restrictor selectively engaging with and restricting said steering system, said turning restrictor being operable to increase an opposing turning force when said grading device is in said raised position.

4. The three-wheeled vehicle according to claim 3 wherein said turning restrictor operates as a friction strap selectively engaging a turning shaft of said steering system.

5. A three-wheeled vehicle comprising:
   a frame;
   a pair of rear wheels supporting said frame;
   a single front wheel supporting said frame;
   a steering system coupling a steering wheel to said single front wheel, said steering system operable to pivot said single front wheel in response to a steering input from said steering wheel;
   a grading device positionable in a raised position and a lowered position;
   a steering limiting system operably coupled with said steering system, said steering limiting system operable in a normal reaction mode when said grading device is in said lowered position and a slow reaction mode when said grading device is in said raised position; and
   a physical turning limiter selectively engaging said steering system to limit turning travel of said steering system when said grading device is in said raised position.

6. The three-wheeled vehicle according to claim 5 wherein said physical turning limiter comprises:
   a pin positionable in an engaged position and a disengaged position;
   an actuator driving said pin between said engaged and disengaged positions; and
   a slot formed in a turning shaft of said steering system, said slot sized to receive said pin and limit said turning travel of said steering system.

7. A three-wheeled vehicle comprising:
   a frame;
   a pair of rear wheels supporting said frame;
   a single front wheel supporting said frame;
   a steering system coupling a steering wheel to said single front wheel, said steering system operable to pivot said single front wheel in response to a steering input from said steering wheel;
   a grading device coupled to said frame;
   a grading device actuation system operable to position said grading device in a raised position and a lowered position; and
   a steering limiting system operably coupled with said steering system, said steering limiting system operable in a normal reaction mode and a slow reaction mode, said steering limiting system having a switch device coupled with said grading device actuation system, said switch device outputting a control signal when said grading device is in said raised position, said steering limiting system switches to said slow reaction mode in response to said control signal.

8. The three-wheeled vehicle according to claim 7, further comprising:

a turning restrictor selectively engaging and restricting with said steering system, said turning restrictor being operable to increase an opposing turning force in response to said control signal.

9. The three-wheeled vehicle according to claim 8 wherein said turning restrictor operates as a friction strap selectively engaging a turning shaft of said steering system.

10. The three-wheeled vehicle according to claim 7, further comprising:

a physical turning limiter selectively engaging said steering system to limit turning travel of said steering system.

11. The three-wheeled vehicle according to claim 10 wherein said physical turning limiter comprises:

a pin positionable in an engaged position and a disengaged position;

an actuator driving said pin between said engaged and disengaged positions; and a slot formed in a turning shaft of said steering system, said slot sized to receive said pin and limit said turning travel of said steering system.

12. The three-wheeled vehicle according to claim 7 wherein said grading device is a trap rake.

* * * * *